United States Patent [19]

Dunn et al.

[11] Patent Number: 4,599,914
[45] Date of Patent: Jul. 15, 1986

[54] BICYCLE PEDAL GRIPS

[76] Inventors: William R. Dunn, 15215 S.W. 78th Pl., Miami, Fla. 33157; Richard F. Dea, 9701 N.W. 14th St., Plantation, Fla. 33322

[21] Appl. No.: 513,467

[22] Filed: Jul. 13, 1983

[51] Int. Cl.$^4$ .............................................. G05G 1/16
[52] U.S. Cl. .................................... 74/563; 74/594.6
[58] Field of Search ................. 74/594.6, 563, 594.4; 36/131; 24/442; 2/DIG. 6

[56] References Cited

U.S. PATENT DOCUMENTS

| D. 191,091 | 8/1961 | Harwood | 74/594.6 X |
| 1,358,488 | 11/1920 | Woodham | 74/563 |
| 3,414,093 | 12/1968 | Chostner | 24/442 |
| 3,859,867 | 1/1975 | Haines et al. | 74/563 |
| 4,220,302 | 9/1980 | Hampton et al. | 24/306 |

FOREIGN PATENT DOCUMENTS 93139 10/1896 Fed. Rep. of Germany ........ 36/131

OTHER PUBLICATIONS

German Utility Model 7504725 (2/17/1975) Klasse A63, p. 850, GMA-HEFT 24, 12/6/1975.

Primary Examiner—Gary L. Smith
Assistant Examiner—Vinh Luong
Attorney, Agent, or Firm—Robert Van Der Wall

[57] ABSTRACT

A device adheres between the sole of a bicyclist's foot and a conventional bicycle pedal to effect substantially instantaneous adherence and release therebetween without use of manual manipulation, special shoes, tools, special bicycle parts or the like. A first mating portion is removably attached to a conventional bicycle pedal utilizing fabric type adherence panels of hooks and loops of the type presently commercially available under the trademark VELCRO. A second mating portion is similarly removably attached to the sole of a conventional bicyclist's shoe. Mating panels on the top of the bicycle pedal on bottom or sole of the bicyclist's foot or shoe then create the adherence. The adherence panels are used both for attachment of the first and second mating portions to the pedal and shoe respectively, and also for creating the adherence between the bicyclist's foot and bicycle pedal.

7 Claims, 9 Drawing Figures

BICYCLE PEDAL GRIPS

FIELD OF THE INVENTION

The present invention relates to the field of devices used for adherence between the sole of a bicyclist's or biker's foot and a bicycle pedal, and, more particularly, to a device which uses VELCRO TM material to create adherence between pedal and sole, and also to attach component parts to the biker's foot and bicycle pedal. Alternatives to VELCRO may also be used.

BACKGROUND OF THE INVENTION

As is well known to people who race bicycles in competition, there is significant usefulness in improving the adherence of a bicyclist's foot to the surface of a bicycle pedal. Various techniques and apparatus are well known in the art to accomplish this, and the inventive activity in this field goes back a long time. In 1897, Henry Tudor of Boston, Mass. was granted U.S. Pat. No. 588,038 for a device which sought to maintain contact between sole and pedal using magnetism.

Straps have frequently been employed, but such devices have always been a compromise between maintaining contact or adherence between sole and pedal, and quick release of the same for stability when the biker stops or balance is lost. Safety is sacrificed if quick release without manual manipulation of the device is minimized or eliminated. Sometimes metal semirigid retaining members are employed with or without flexible straps. Examples of such art include Foster, U.S. Pat. No. 4,172,392 and Mohr, U.S. Pat. No. 4,200,005. An interesting reference is Harwood, U.S. Pat. No. Des. D191,091 showing a wide band of material permanently connected to the pedal which appears to use VELCRO as the attaching means, in a different way than the present invention, but it appears also to require manual manipulation for release, thus compromising safety. One of the above references, Mohr, also specifically recites the use of VELCRO, but both the invention and use of VELCRO is significantly different than the present invention.

The keys to the present invention lie in the inventor's discovery of two correlating facts: (a) there is a greater need for adhering forces to resist slipping than there is to develop vertical pressure between bicycle pedals and biker soles; and (b) the force to separate mating portions of VELCRO is much greater in shear than in tension. Thus by mating a first portion of VELCRO on the surface of pedal and a second portion of VELCRO on a sole, three results are obtained (1) Slipping forces which, in this geometry are shear forces, are greatly resisted, creating strong adherence in the direction most needed. (2) Mild adherence between sole and pedal is provided because in this geometry such forces are the tension. (3) Quick release without manual manipulation for safety is achieved, since removal of the sole from the pedal is a tensile force with this geometry.

Since VELCRO is essentially a self-adhering material with quick release, and is suitable for a great number of adhering and separation cycles without losing its adhesion qualities, it is ideally suited for the adherence property sought.

Of course, the need for improving adherence between biker's sole and bicycle pedal is not limited to bicycle competion. The need for same exists to some degree with all bicyclists. Many casual or recreational bikers will have interest in the aid provided by the present invention, but nearly every biker engaging in the sport primarily for exercise and the long distance rider is likely to favor the invention most of the time.

A major feature of the present invention is the ability to almost instantaneously apply or remove the first mating portion of VELCRO to the pedal and second mating portion of VELCRO to the sole without tools, special bicycle parts, changing shoes, or the like. The present invention will fit any shape, size or style of shoe, instantly adapting to different people, and one size will fit and is readily attached to any conventional bicycle pedal. Attaching means of the first and second mating portions respectively to pedal and sole are optional, but are preferably also VELCRO, which has sufficient adhering force to attach and hold the component parts to the sole and pedal, and which adds to the speed and convenience with which the use of invention may be initiated or terminated.

SUMMARY OF THE INVENTION

Bearing in mind the foregoing, it is a principal object of the present invention to provide a device for increasing the adherence between the sole of a bicyclist's foot and a bicycle pedal.

Another principal object of the present invention is to provide a means to increase resistance to slipping or shear forces between the sole of the foot and a bicycle pedal, while at the same time allowing a quick release of that means for safety.

A further object of the invention is to accomplish the foregoing objects without making permanent modifications to the bicycle itself, but rather by the addition of a device which can be easily added or removed.

A further object of the invention is to provide such a device which can be used with conventional shoes and can be readily attached to or removed from any conventional shoe.

A related object of the invention is to furnish such a device which can be accomodated to virtually any size of shoe without being fitted to the shoe size of the user.

Another object of the invention is to provide a device which strongly resists slipping or shear forces between the sole and the pedal, provides mild adherence between sole and pedal in tension, provides quick release without manual manipulation for safety, and accomplishes all of the foregoing objects and advantages with lightweight, inexpensive, and multiply reusable materials of compact size which can be adapted to any substantially conventional bicycle pedal and any shoe size.

Other objects and advantages will become apparent to those skilled in the art upon reference to the following descriptions in the drawings.

The present invention is described utilizing VELCRO as the material creating adherence because it is particularly well adapted to the requirements and purposes of the present invention. Of course, alternative materials presently available or hereafter developed having similar characteristics may be substituted therefor. To those unfamiliar with it, VELCRO is a commercially available product intended as a multiply reusable fabric fastener. It is comprised of panels of loops standing substantially erect from the surface of base material and panels of hooks standing substantially erect from a base material. The VELCRO operates as a fastener when a panel of hooks is pressed against the panel of loops, thereby engaging the hooks in the loops in a random manner. However, there are great numbers of both hooks and loops so that a substantial number of them engage. However, both are made from a flexible material, and separation can be effected by pulling the two panels apart in tension which forces the loops to straighten out so they can be withdrawn from the hooks. The force required to remove a single hook from a single loop is small, but is multiplied by the engagement of numerous such looks in such loops resulting in a reasonable fastening force and a reasonable tensile force to separate the same. Following removal, the loops, which are resilient, spring back to a hook shaped position for later use. This is again accomplished by pressing a hook panel against a loop panel. This can be accomplished many times without adverse effects on VELCRO materials.

In accordance with the invention there is provided a first mating portion attached to the bicycle pedal and a second mating portion attached to the sole of the biker's foot. The first mating portion is comprised preferably of a central band of elastic fabric to which is connected, preferably by sewing, a plurality of loop panels of VELCRO. Since the base fabric on which both loop and hook panels of VELCRO are made is generally not elastic, space is left between the VELCRO panels to permit the central band of elastic fabric to stretch. These plurality of loop panels are preferably placed on a first side of the central band of the first mating portion. On the reverse side of the central band of the first mating portion is connected, preferably by sewing, a panel of VELCRO hooks. Also connected, preferably by sewing, are two fastening straps comprised of VELCRO hook material. The first mating portion of the invention is then wrapped around the bicycle pedal tightly, stretching the central band to do so and attaching each end of the central band to the other using the VELCRO connected thereto. The fastening straps are then wrapped around the inside end of the pedal on both sides of the crank arm shaft on which the pedals rotate. These straps are then connected to loop portions of VELCRO previously connected to the central band, thereby preventing the first mating portion from sliding laterally off the pedal. Since the fastening straps are relatively narrow compared to the loop panels of VELCRO to which they are attached, a substantial surface of loop panel of VELCRO remains exposed on either side of the pedal for later adherence to a hook panel placed on the bottom of the sole of the biker's foot.

The second mating portion of the invention is also comprised of a central band of elastic fabric to which is connected, preferably by sewing, a plurality of panels of VELCRO. Since the second mating portion of the invention is wrapped around the foot of the biker, the sides thereof will be referred to as the inside and the outside surface. The outside surface will have a substantial hook panel of VELCRO connected, preferably by sewing thereto. The ends of the second mating portion will have attached thereto on a first end a hook panel of VELCRO and on a second end a loop panel of VELCRO. These should be on opposite sides of the second mating portion central band so that the central band may be wrapped tightly and stretched around the portion of the biker's shoe containing the ball of the foot. The end panels of VELCRO hold the second mating portion snugly in place around the biker's shoe. Protruding from one end of the second mating portion central band is a removable loop which, when pulled upon, creates a tensile force to separate the end panels of VELCRO in the central mating portion allowing removal thereof from the foot.

When the second mating portion is attached to the foot, it is positioned so that the substantial hook panel of Velcro is positioned at the sole and the biker then places this substantial hook panel onto the corresponding VELCRO loop panel connected to the first mating portion which has previously been attached to the bicycle pedal. An adhering force is then created between the substantial hook panel on the sole and the loop panel on the pedal when the two are pressed together. The effect is to create a strong shear force preventing the biker's sole from slipping forward, backward or sideways, but which can be readily terminated by the biker raising his foot directly upward from the top of the pedal. The same is of, course, accomplished for each foot and on each pedal of the bicycle.

DETAILED DESCRIPTION

Figure 1:
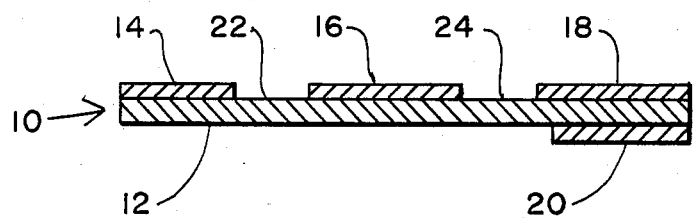
FIG. 1 shows a cross-sectional view to a first mating portion of the invention seen along the line 1—1 of FIG. 2.

Turning now to FIG. 1, the first mating portion 10 is shown in cross section and comprises a central band 12 to which is connected a plurality, preferably three, panels 14, 16 and 18 of VELCRO. These panels are connected preferably by sewing and are preferably the loop form of VELCRO. Also shown is an additional panel of VELCRO 20 on the opposite side from the plurality, with panel 20 preferably being attached also by sewing and being preferably a hook panel of VELCRO. In use, panel 14 and panel 20 come in contact with each other and must be mating panels, i.e. if 14 is a hook panel, then 20 must be a loop panel, or vice versa. Central band 12 of first mating portion 10 is preferably an elastic fabric so that the portion thereof between panels 14 and 16, shown generally at 22, and the portion thereof between panels 16 and 18, shown generally at 24, can be stretched since VELCRO panels 14, 16, 18, and 20 are generally made with an inelastic base fabric and the elasticity of central band 12 must occur where panels of VELCRO are not attached.

Figure 2:
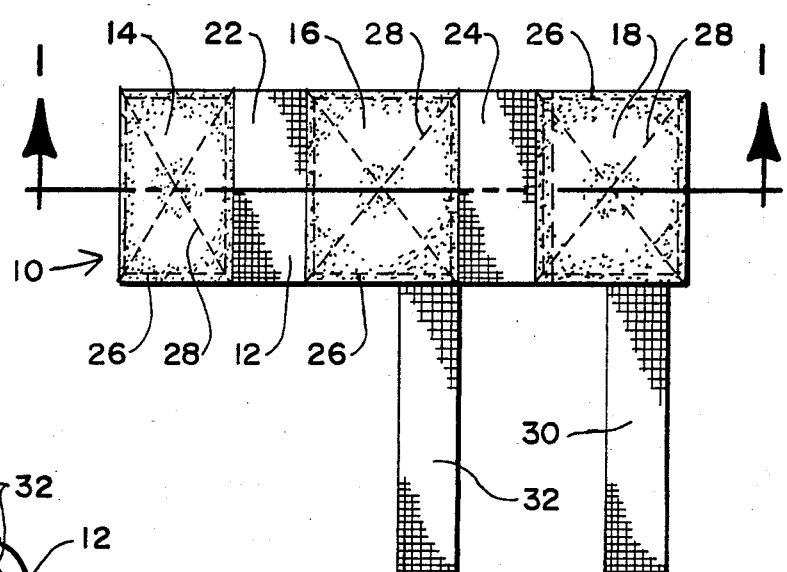
FIG. 2 is a top plan view of a first mating portion of the invention.

Turning now to FIG. 2, first mating portion 10 is shown in top plan view indicating panels 14, 16 and 18 which are sewn to central band 12 and showing exposed portions thereof at 22 and 24. Panels 14, 16 and 18 are connected to central band 12 by sewing, the stitching of which is about the border of each panel shown typically at 26 and diagonally across each panel shown typically at 28. Also shown are fastening straps 30 and 32 which are preferably made from VELCRO, or have VELCRO attached thereto. In use, fastening strap 30 mates with VELCRO panel 16 and fastening strap 32 mates with VELCRO panel 18, and must therefore be the opposite of the corresponding panel. For example, if VELCRO panel 16 is loop material, then fastening strap must be hook material. Similarly if VELCRO 18 is loop material, then fastening strap 32 must be hook material. Fastening straps 30 and 32 are wrapped around the inside end of a bicycle pedal to attach first mating portion 10 to the bicycle pedal, thereby preventing lateral sliding thereof. Fastening strap 30 and 32 go on both sides of the crank arm shaft on which the pedal rotates as shown in later figures.

Figure 3:
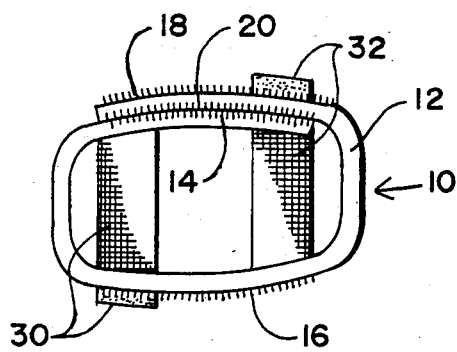
FIG. 3 is an end view of a first mating portion of the invention when folded in the manner in which it would be attached to a bicycle pedal.

In FIG. 3, first mating portion 10 is shown folded up as it would be around a bicycle pedal, except that the pedal is omitted for clarity. The central band 12 is stretched tightly about the pedal in use held in position by VELCRO panel 20 mating with VELCRO panel 14. VELCRO panels 16 and 18 are exposed on either side of the pedal and to those have been attached fastening straps 30 and 32.

Figure 4:
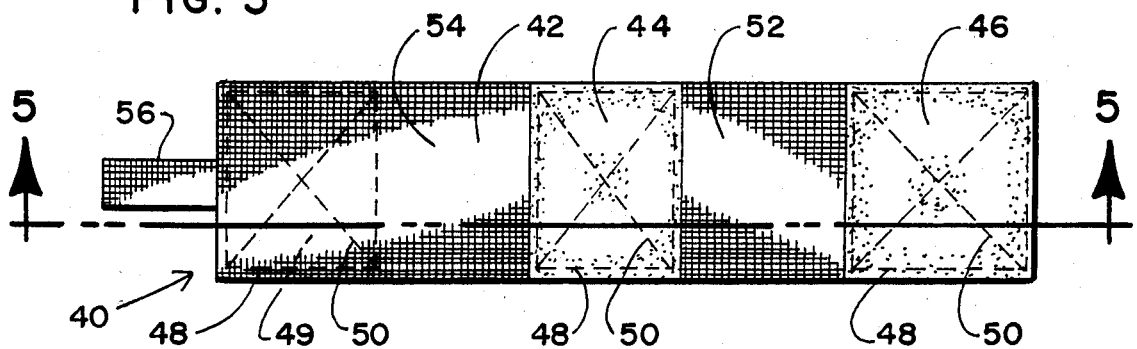
FIG. 4 is a top plan view of a second mating portion of the invention.

In FIG. 4, second mating portion 40 is shown with central band 42. Central band 42 is also preferably an elastic fabric to which is connected on a first side thereof Velcro panel 44 and 46 on a first side thereof and VELCRO panel 49 on a second side thereof. The first side thereof will be termed the outside for reasons later set forth to which VELCRO panels 44 and 46 are connected, preferably by sewing, around the periphery as shown typically at 48 and diagonally as shown typically at 50. Central band 42 has elastic properties which can stretch only in the exposed portion 52 between panels 44 and 46 and 54 between panels 44 and 49. This is for similar reasons to that described above for the first mating portion of the invention. Since panels 46 and 49 mate in use, they must be of different types of VELCRO. Therefore, if panel 46 is of loop Velcro, then panel 49 must be of hook VELCRO. Furthermore, since the first mating portion and second mating portion adhere to each other, panels 44 and 46 must be of the opposite VELCRO as panels 16 and 18. Also shown in FIG. 4 is removal loop 56 which is connected to central band 42 and projects outward from the end of the central band to which panel 49 is connected. Panel 49 is also connected preferably by sewing to central band 42 with sewing around the periphery at 48 and diagonally at 50.

Figure 5:
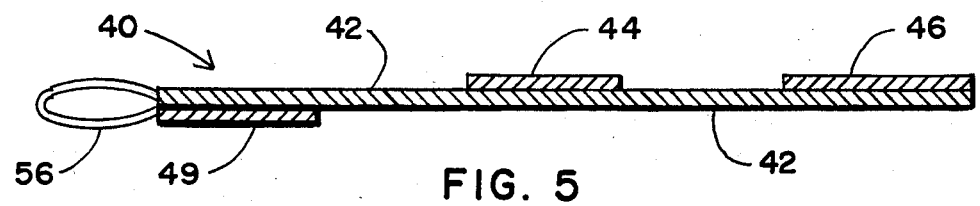
FIG. 5 is a cross-sectional view of a second mating portion of the invention seen along the line 5—5 of FIG. 4.

FIG. 5 shows a cross-sectional view of second mating portion 40 taken along the lines 5—5 of FIG. 4. Second mating portion 40 is shown comprised of central band 42 to which is attached on the outside VELCRO panels 44 and 46. On the opposite side thereof is shown VELCRO panel 49 which is in proximity to removal loop 56.

Figure 6:
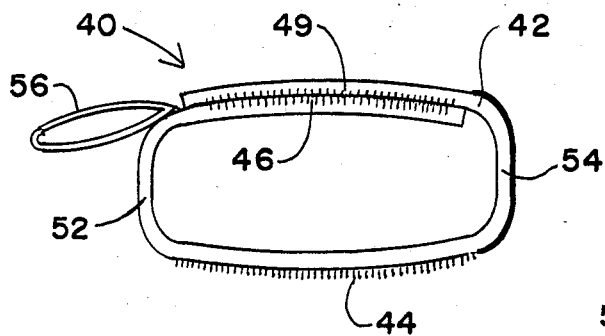
FIG. 6 is an end view of a second mating portion of the invention when folded in the manner in which it would be attached to the foot of a biker.

Second mating portion 40 is shown folded in FIG. 6 in the manner in which it is tightly wrapped around the shoe of a biker, but with the shoe removed for clarity. The elastic fabric of central band 42 is stretched between VELCRO panels 44 and 46 as at 52 and between panels 44 and 49 at 54. VELCRO panels 46 and 49 mate with each other to hold second mating portion 40 tightly around the shoe (not shown) of the biker and exposing VELCRO panel 44 in a generally downward orientation. VELCRO panel 44 must mate with and adhere to VELCRO panel 16 or 18 as set forth above and must, therefore, be the reverse type. Removal loop 56 projects outward from the side where it can be easily reached by the biker to lift and remove VELCRO panel 49 from VELCRO panel 46.

Figure 7:
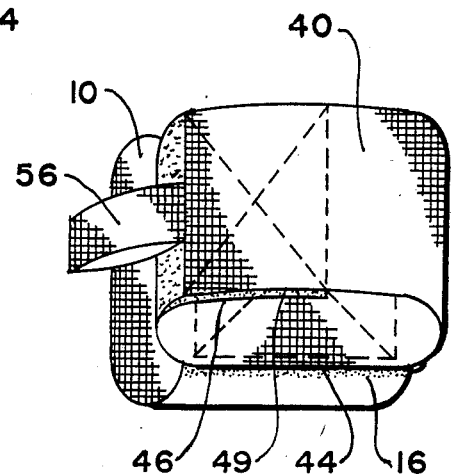
FIG. 7 shows the relationship when folded of a first mating portion of the invention adhering to a second mating portion of the invention as both are folded when in use, but, for clarity, omitting the foot of the user and the bicycle pedal.

In FIG. 7, the orientation of first mating portion 10 is shown beneath and at right angles to second mating portion 40 since first mating portion 10 goes around a bicycle pedal (not shown) and second mating portion 40 goes around the shoe (not shown) of the biker. The two parts are shown mated together, but can be separated by the biker exerting reasonable upward force on second mating portion 40 to separate it from first mating portion 10 around the bicycle pedal. Alternatively, the shoe of the biker may be extracted from the invention by pulling removal loop 56 manually.

Figure 8:
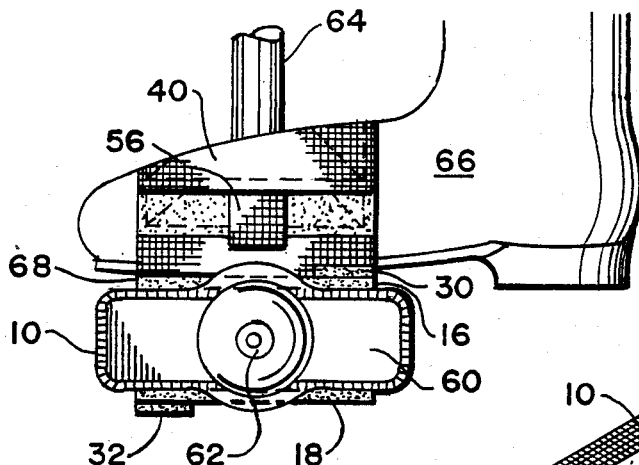
FIG. 8 shows the first and second mating portions of the invention with bicycle pedal inserted into the first mating portion, and biker's foot inserted into the second mating portion, the two mating portions adhering to each other in the manner of the invention.

In FIG. 8, the invention is shown in operation with first mating portion 10 stretched and fastened about pedal 60 rotatably mounted on shaft 62 and connected to crank arm 64. Also shown is second mating portion 40 wrapped tightly around shoe 66, first mating portion 10 adhering to second mating portion 40 at 68. First mating portion 10 is prevented from lateral slipping by fastening straps 32 and 30 connected respectively to VELCRO panels 16 and 18. Second mating portion 40 is preferably wrapped about the ball of the foot of shoe 66. Removal loop 56 is available to remove shoe 66 from second mating portion 40 if desired, or the first and second mating portions adhering together at 68 may be separated by a vertical force upward exerted by the biker on shoe 66.

Figure 9:
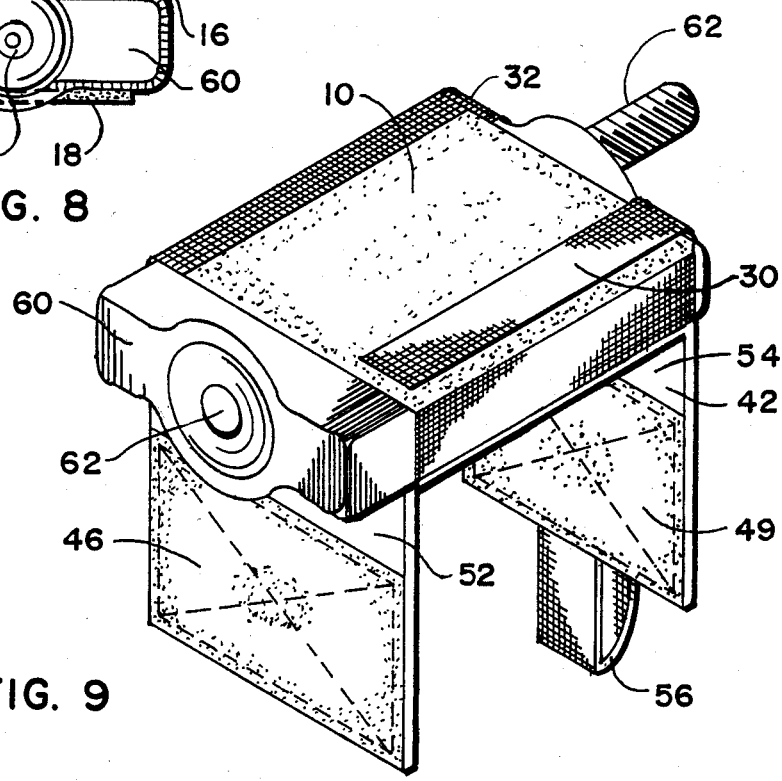
FIG. 9 shows first and second mating portions of the invention attached to the bicycle pedal, adhering to each other, but with the biker's foot removed.

Turning finally to FIG. 9, pedal 60 supported on shaft 62 is shown inverted because removal loop 56 has been pulled and shoe 66 removed. Fastening straps 30 and 32 are shown around the back inside edge of pedal 60 holding first mating portion 10 from slipping outward along pedal 60. VELCRO panels 49 and 46 are also readily visible. To be used, pedal 60 would be turned back over, shoe 66 would be inserted, and panels 46 and 49 would be mated after stretching central band 42 at 52 and 54.

It should be noted that the present invention has been described in terms of the use of VELCRO in the preferred embodiment, but the inventors contemplate the use of other surfaces having substantially similar properties thereto, including one or more of the following: relatively high shear resistance, moderate adherence in tension, reasonable flexibility, repeated reusability, etc. Accordingly, in the claims, VELCRO will be referred to as adherence panels or material, with hook panels being male adherence panels and loop panels being female adherence panels.

Having described the presently preferred embodiments of the invention, it should be understood that various changes in construction and arrangement will be apparent to those skilled in the art and are fully contemplated there without departing from the true spirit of the invention. Accordingly, there are covered all alternatives, modifications and equivalents as may be included within the spirit and scope of the invention as defined herein by the appended claims, including particularly, but not limited to, substitution of other adherence media for the VELCRO described in the present specification.

We claim:

1. A bicycle pedal grip in combination with a bicycle pedal comprising:

a first mating portion having a flexible central band attached at least in part to the bicycle pedal by wrapping said central band around the pedal, at least one first mating portion adherence panel connected thereto, and at least one fastening strap connected to the first mating portion at substantially right angles to the direction said central band is wrapped around the pedal, said fastening strap being wrapped around an inside edge of the pedal and having adherence properties with respect to and being removably adhered to at least one first mating portion adherence panel whereby said first mating portion is prevented from slipping outward along the pedal but is readily removable therefrom; and a second mating portion having a flexible central band, at least one second mating portion adherence panel connected thereto and having adherence properties with respect to at least one first mating portion adherence panel, said second mating portion being attachable to a sole of a foot of a bicyclist at least in part, in readily removable manner, by wrapping said second mating portion about a ball of the foot.

2. The bicycle pedal grip of claim 1 wherein the first mating portion central band is comprised of elastic fabric and is attached to the bicycle pedal at least in part by stretching the first mating portion central band about the pedal.

3. The bicycle pedal grip of claim 1 wherein the second mating portion central band is comprised of elastic fabric and is attached to the sole of the bicyclist at least in part by stretching the second mating portion central band about a foot of the bicyclist.

4. The bicycle pedal grip of claim 1 wherein the second mating portion further comprises a removal loop connected to one end of the second mating portion central band.

5. The bicycle pedal grip of claim 1 wherein the first mating portion flexible central band further comprises two adherence panels having adherence properties with respect to each other, one such panel being connected to a first side of the central band at a first end thereof, and the other such panel being connected to a second side of the central band at a second end thereof.

6. The bicycle pedal grip of claim 1 wherein the second mating portion flexible central band further comprises two adherence panels having adherence properties with respect to each other, one such panel being connected to a first side of the central band at a first end thereof, and the other such panel being connected to a second side of the central band at a second end thereof.

7. The bicycle pedal grip of claim 1 wherein the adherence panels are further comprised of one of the alternatives of:

male adherence panels having a base material from which stands in substantially erect manner a multiplicity of flexible hooks; and female adherence panels having a base material from which stands in substantially erect manner a multiplicity of loops suitable for engaging in a random manner the hooks of the male adherence panels.

* * * * *